July 19, 1960
W. A. WAGNER ET AL
2,945,672
GAS TURBINE UNIT
Filed Oct. 5, 1956
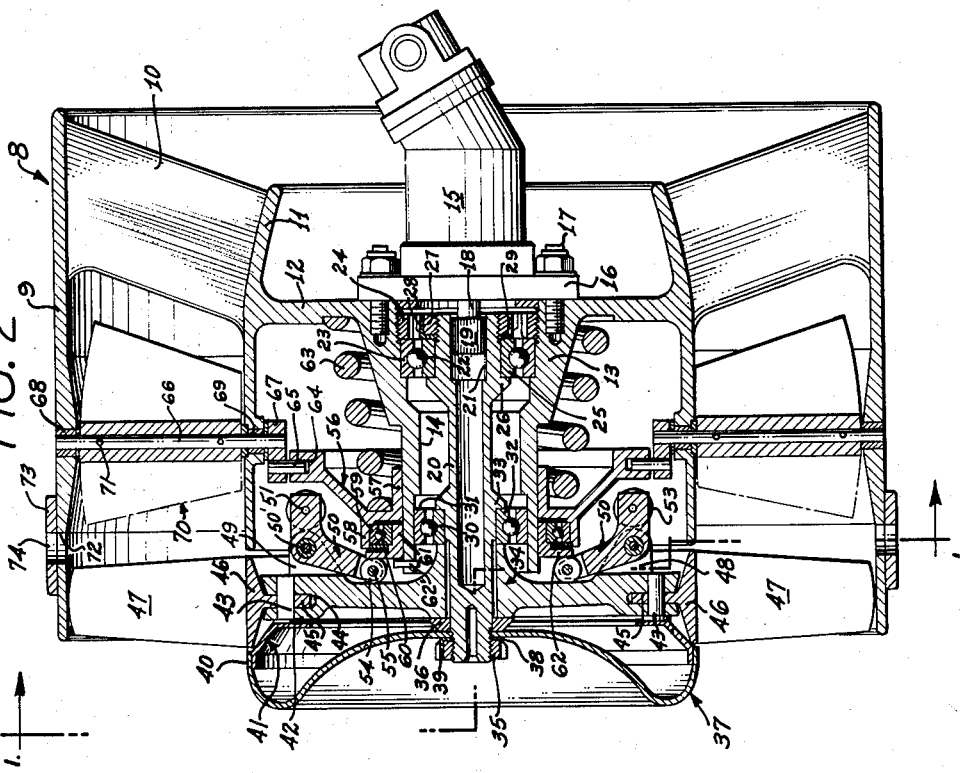
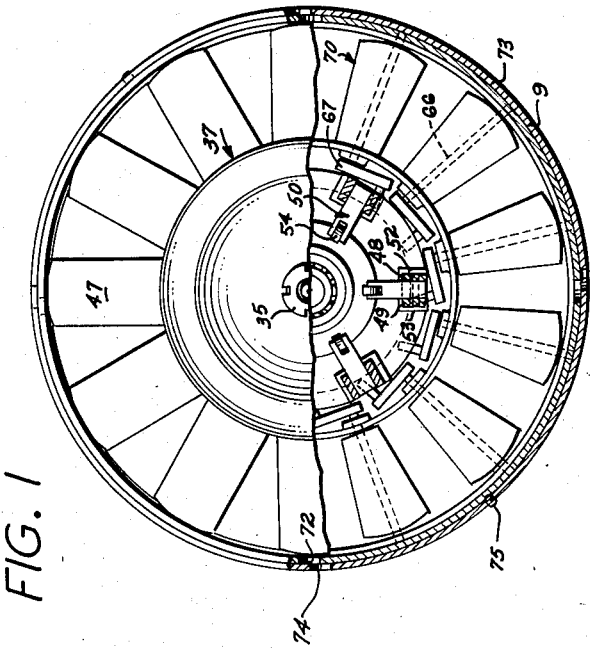
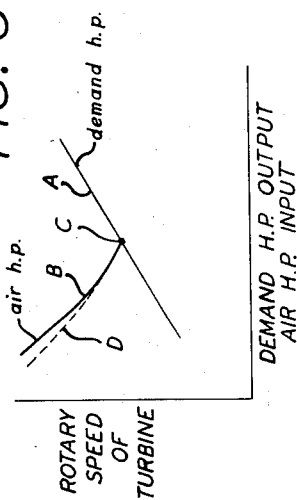
INVENTORS
WILLIAM A. WAGNER
WALTER J. KOERNER
BY R. E. Geauque
ATTORNEY

United States Patent Office 2,945,672
Patented July 19, 1960

2,945,672

GAS TURBINE UNIT

William A. Wagner, Sepulveda, and Walter J. Koerner, Granada Hills, Calif., assignors to The Marquardt Corporation, a corporation of California Filed Oct. 5, 1956, Ser. No. 614,224

11 Claims. (Cl. 253—59)

This invention relates to a gas turbine unit and more particularly to a gas turbine of the ram-air type in which the effective spring rate of the governor can be easily varied.

A gas turbine of the ram-air type is disclosed in copending U.S. patent application Serial No. 403,365 filed January 11, 1954, by Dwight D. Nelson and now Patent No. 2,815,188. In such prior turbines, the turbine rotor is connected with a power unit and the fluid flow through the turbine is varied by a variable area throttle valve controlled by the turbine governor. When the gas turbine is utilized as an emergency source of power for an aircraft, the turbine is placed in operation by either dropping the turbine into the airstream or by opening a duct so that the airstream can enter the unit. Any desirable power unit can be driven by the turbine rotor, such as a hydraulic pump or an electric generator, and it is necessary that the speed of the turbine be controlled within desired limits by the governor in order to control the output of the power unit.

The turbine governing systems of such prior devices have been of the non-isochronous, or proportional type, in which a departure from desired shaft speed causes the governor flyballs to compress a spring in direct proportion to the speed error and the deflection of the spring is transmitted to the variable area throttle valve to change the throttle area. Since the throttle valve is located downstream of the turbine rotor, this change in area changes the turbine back pressure and hence the gas flow through the turbine in order to vary the power output of the turbine and maintain the desired turbine speed under varying power requirements of the power unit. In the manufacture of such governing systems, the rate of the governor spring must be precisely controlled from unit to unit so that the percentage change in throttle area is in exact accordance with the percentage change in turbine power caused by gas flow variations. Also, the dimensions of the units must be accurately controlled since the effective rate of the governor spring is affected by fluid leakage and other variations in assembly.

In the present invention, a novel device is provided to adjust the effective spring rate of the governor by providing a bleed to atmosphere between the turbine rotor and the throttle valve. For this purpose, the bleed can take the form of one or more orifices located in the casing of the gas turbine and upon variation of the orifice area, the relation of the percentage change in turbine power to percentage change in throttle area can be adjusted. Thus, the gas turbines can be manufactured of wide tolerance parts and the orifice area can be easily adjusted after assembly to provide the desired operating characteristics of each unit. To accomplish this adjustment, gas is directed through the unit and the bleed area is varied until the speed governor performs with its specified accuracy. Thereafter, the orifice area is fixed so that all units will operate the same in service. While the bleed illustrated herein comprises openings in the turbine casing coacting with openings in a rotatable ring positioned around the casing, other forms of adjustable bleeds can be utilized.

It is therefore an object of the present invention to provide a gas turbine unit of the ram-air type in which the effective spring rate of the governor can be easily adjusted to compensate for differences in actual spring rate and differences in dimensions from unit to unit.

Another object of the invention is to provide a gas turbine having throttle means controlled by a governor to control the speed of the turbine rotor and having orifice means for varying the flow through the turbine blades independently of the throttle means in order to vary the effective spring rate of the governor.

A further object of the invention is to provide a gas turbine for producing emergency power which can be fabricated of wide tolerance parts and still retain the required accuracy of speed control.

These and other objects of the invention not specifically set forth above will become readily apparent from the accompanying description and drawings in which:

Figure 1 is an end elevational view, partly in cross section, illustrating the turbine rotor and throttling vanes.

Figure 2 is a vertical section along line 2—2 of Figure 1 showing the governing systems for the gas turbine and the orifice means for varying the effective spring rate.

Figure 3 is a plot showing the manner in which the turbine output can be adjusted by the orifice means.

Referring to the embodiment of the invention chosen for illustration, the gas turbine 8 has a circular casing 9 which can be secured to its mounting structure in any suitable manner. A series of radial vane sections 10 extend between casing 9 and circular housing 11 in order to centrally support the housing within the casing. The housing 11 has a partition member 12 from which extends a projection 13 having a central opening 14. A hydraulic pump 15 has a base 16 which is secured to member 12 by means of screws 17 and the pump shaft 18 has a splined end portion 19 positioned within opening 14.

A hollow shaft member 20 extends through the opening 14 and has an end opening 21 which receives splined portion 19. The shaft member 20 is rotatably supported at one end by ball bearings 22 having an outer race 23 positioned against a shoulder of projection 13 by a nut 24 threaded into the end of opening 14. The inner race 25 for ball bearings 22 is held against shoulder 26 of shaft member 20 by a nut 27 threaded onto the end of shaft member 20 and held in position by leg 28 of lock washer 29. The other end of shaft member 20 is rotatably supported by ball bearings 30 having an outer race 31 positioned in opening 14 and an inner race 32 positioned between shoulder 33 of shaft member 20 and hub 34 of the turbine. The hub 34 is keyed to the shaft member 20 and is held on the shaft member by a nut 35 threaded on the end of the shaft. A spacing member 36 and a cover member 37 are positioned on shaft 20 between the hub 34 and the nut 35 and a lock washer 38 has an extension 39 for holding the nut 35 in place.

The cover member 37 is generally cup-shaped and has a circular edge 40 to which is secured a circular member 41 having a surface 42 positioned to continually press against pins 43 and retain the pins in openings in hub 34. The hub 34 has a groove 44 around its circumference which receives lugs 45, each of which is secured to a base 46 of one of the blades 47 of the turbine and the pins 43 pass through an opening in each lug in order to fasten the blades to the hub. The blades 47 and hub 34 form the rotor of an axial flow turbine and the shaft 20 of the turbine is connected between the hub 34 and the hydraulic pump 15 in order for the turbine rotor to drive the pump. It is understood that the hydraulic pump can be replaced by other types of power units, such as an electrical generator, and that more than one power unit can be driven by the turbine.

The mechanism for controlling the speed of the turbine and the output of pump 15 will now be described. The hub 34 mounts a number of pairs of brackets, comprised of projections 48 and 49, positioned on opposite sides of an arm 50 which is pivotally mounted by a shaft 50'. Each arm 50 carries a rod 51 at one end for supporting flyweights 52 and 53 on opposite sides of the arm. The other end of the arm contains a groove for receiving a roller 54 which is pivotally supported by a shaft 55. It is therefore apparent that the arm 50 can be moved about shaft 50' in response to centrifugal force acting upon flyweights 52 and 53 during rotation of hub 34.

A conical member 56 has a circular extension 57, which slides upon the surface of projection 13, and a circular extension 58 which carries the outer race 59 for ball bearings 60. The inner race for bearings 60 is carried by one arm 61 of an angular member while the other arm 62 of the member is positioned to engage roller 54. A conical coil spring 63 surrounds projection 13 and has one end bearing against partition 12 while the other end bears against conical member 56. It is apparent that the flyweights 53 will rotate with the turbine blades 47 and will move radially outward against the force of spring 63 when the turbine rotor exceeds the desired speed. The friction between rollers 54 and arm 61 will cause the angular member, composed of arms 61 and 62, to also rotate with the turbine rotor and, at the same time, the angular member will transmit the force of the flyweights to the conical member 56. A stop 62' is provided to limit the movement of member 56 toward the hub 34.

The member 56 has a circumferential groove 64 which receives a number of pins 65 which are attached to a plurality of shafts 66 by means of arms 67. Shafts 66 are rotatably supported at opposite ends by bearings 68 and 69 in casing 9 and housing 11, respectively, and a movable throttle vane 70 is secured to each of the shafts by pins 71. The vanes 70 are positioned upstream from section 10 and are in their maximum open position when the flyweights are in their innermost position, as illustrated in Figure 2. The blades 47 are of the axial flow type and are positioned at an angle to the axis of the turbine so that air flow through the casing 9 will rotate the turbine rotor and drive pump 15.

When the turbine rotor overspeeds, the flyballs 53 will move outwardly under the action of centrifugal force and will move member 56 against the force of spring 63. Pins 65 will move with member 56 since they are free to slide in groove 64 and this movement of pins 65 will rotate arms 67 and vanes 70 in a direction to close down the air passage behind the turbine blades and thereby reduce the speed of the turbine by reducing the mass air flow through the turbine blades. After the turbine speed returns to the regulated value, the spring 63 will return the member 56 to its original position and the pins 65 will move the vanes 70 back to their original position. Thus, the movable throttle vanes 70 serve the purpose of regulating the quantity of air flow through the turbine and thus, the power output of the turbine. Also, the vanes serve the purpose of straightening out the air flow behind the turbine blades.

Since differences in the rate of the governor springs and differences in dimensions of turbine parts can occur from unit to unit in mass production of the turbine, adjustable orifice means are provided in the casing between the turbine rotor and the throttling vanes to assure that the percentage change in throttle area for each turbine unit is in exact accordance with the percentage change in turbine power caused by gas flow variations. In the present embodiment, the orifice means consists of a plurality of circular openings 72 located in casing 9 between blade 47 and vanes 70. While four such openings have been illustrated, it is understood that the number can be varied. A circular ring 73 is located around casing 9 and contains a plurality of openings 74, each of which is located to co-operate with one of the openings 72 in the casing. Since the openings 72 and 74 are in the same radial plane, the ring 73 can be positioned to place the openings in exact alignment and the ring 73 can be rotated to partially or totally block the openings 72. Thus, the amount of air bleed to atmosphere through the openings can be varied by rotation of ring 73 in order to adjust the effective spring rate of the governor and change the relationship of the percentage change in turbine power to the corresponding percentage change of throttle area.

Referring to Figure 1, the openings 74 in ring 73 are shown positioned relative the openings 72 so that approximately one-half of the areas of openings 72 are effective to bleed air to atmosphere from the space between the turbine blades and the throttling vanes. Each turbine unit can be initially tested by directing gas through the unit with the ring in this position and checking the performance of the governor. In the event the governor does not perform with the specified accuracy, the ring 73 can be rotated to either increase or decrease the effective bleed area of openings 72 until the specified accuracy is obtained. Thereafter, the ring 73 can be rigidly locked in the adjusted position by set screw 75 and the turbine is ready for service operation.

The change in the bleed area accomplished by rotation of ring 73 has the effect of varying the amount of air passing through the turbine blades. Referring to the plot of Figure 3, curve A represent the variation of turbine speed with demand horsepower of unit 15 while curve B represents the desired or design variation of air horsepower with turbine speed and the point C of intersection of these two curves occurs at the design speed of the turbine unit. Curve D represents one air horsepower curve that could result on initial test of a turbine with the bleed openings 72 approximately one-half open.

It will be noted that curve B has a concave shape which is determined by the design characteristics of spring 63 and that curve D is less concave than curve B. Prior to assembly of the turbine units, each spring is adjusted so that movement of the flyweights will commence at the same design speed and this adjustment is made by placing a shim of proper thickness between the end of the spring and partition member 12. With this adjustment, the springs for all units will have the same rate characteristics over the initial compression range and therefore curves B and D will be the same over the first portion of vane closing. Also the bleed openings have very little effect over this operating portion of the vanes, since the openings 72 are normal to the flow and the vanes, in the open position, do not increase the back pressure on the turbine sufficiently to cause right angle flow. Therefore, variations in the effective area of openings 72 by ring 73 do not affect the governor operation in the open range of the vanes. However, upon continued compression of the spring with movement of the vanes to the middle range, the variation in spring characteristics resulting from manufacturing tolerances becomes apparent and as the vanes move to closed position with corresponding increased compression of the spring, the variations in spring rate becomes larger from unit to unit. Thus, the slope of curve D is less than that of curve B since the spring of the turbine unit corresponding to curve D has a rate different from the design rate.

In order to adjust the effective spring rate of this unit, the bleed area of openings 72 can be increased until the curve D becomes identical with curve B in the high speed range. This change in position of curve D results from the fact that as the vanes approach closed position, the back pressure on the turbine is gradually increased causing more and more flow through the bleed openings for any set position of ring 73. Thus, the air flow through the turbine increases in the same manner over that which would result if no bleed openings were present. Because the flow of bleed air for any setting of ring 73 increases with closure of the vanes, and because the flow for any setting of the vanes in the high speed range increases with the effective area of the bleed openings, the slope of curve D can be increased to correspond with the slope of curve B and thus, the effective spring rate of the turbine is adjusted to provide the desired relation of percentage change in turbine power to corresponding percentage change of throttle area. It is apparent that if the test curve D for any particular turbine unit should have a greater slope than design curve B, the effective area of openings 72 could be decreased by rotation of ring 73 to obtain the desired effective spring rate, since the openings are approximately half open during the initial test.

While the illustrated embodiment of the invention utilizes twelve turbine blades, thirteen movable throttle vanes and six pairs of flyweights, it is understood that the number of each of these elements can be varied in any desired manner. Also, the number and type of orifices or openings located in casing 9 can be varied and any suitable mechanism can be utilized to vary the amount of bleed area of the orifices. The invention is applicable to various other types of governor utilizing biasing means which are subject to variations in rate in the same manner as springs because of differences from unit to unit. Further, the turbine unit can be driven by any suitable fluid, other than air. Various other modifications are contemplated by those skilled in the art without departing from the spirit and scope of the invention as hereinafter defined by the appended claims.

What is claimed is:

1. A gas turbine unit comprising a circular casing defining a fluid passage, a turbine rotor having blades positioned at the inlet of said casing to be driven by fluid flow through said casing, movable throttle vanes located downstream of said blades for varying the flow area of said casing, governor means responsive to the speed of said rotor for changing the position of said vanes upon any change in speed sensed by said governor means in order to change the flow area of said casing and control the speed of said turbine rotor, and continually open orifice means located in said casing between said blades and said vanes for bleeding to atmosphere a portion of the air discharged from said blades, the size of the open area of said orifice means serving to determine the effective rate of said governor means.

2. A gas turbine as defined in claim 1 having blockage means movable relative to said orifice means for varying the open area of said orifice means to adjust the effective rate of said governor.

3. A gas turbine as defined in claim 1 wherein said orifice means comprises first passage means in said casing, and means for varying the open area of said first passage means to adjust the effective rate of said governor, said varying means comprising a ring surrounding said casing and having second passage means coacting with said first passage means in said casing so that rotation of said ring relative to said casing will adjust the effective open area defined by both said passage means.

4. A gas turbine unit comprising a circular casing defining a fluid passage, a turbine rotor having blades positioned at the inlet of said casing to be driven by the fluid entering said casing, movable throttle vanes located downstream of said blades for varying the flow area of said casing, governor means responsive to the speed of said turbine rotor and comprising flyweights and a speeder spring, linkage means responsive to any movement of said flyweights for changing the position of said vanes and the flow area of said casing and thereby control the speed of said rotor, and continually open orifice means located in said casing between said blades and said vanes for bleeding to atmosphere air discharged from said blades, the size of the open area of said orifice means serving to control the effective rate of said spring.

5. A gas turbine as defined in claim 4 having blockage means movable relative to said orifice means for varying the open area of said orifice means to adjust the effective rate of said governor.

6. A gas turbine as defined in claim 4 wherein said orifice means comprises openings in said casing, and means for varying the open area of said openings to adjust the effective rate of said spring, said varying means comprising a ring surrounding said casing and having an opening coacting with each opening in said casing so that rotation of said ring relative to said casing adjusts the effective open area defined by each pair of coacting openings.

7. A gas turbine unit comprising a circular casing defining a fluid passage, a turbine rotor having blades positioned at the inlet of said casing to be driven by the fluid entering said casing, movable throttle vanes located downstream of said blades for varying the flow area of said casing, governor means responsive to the speed of said turbine rotor and comprising flyweights and a coil speeder spring, linkage means responsive to any movement of said flyweights for changing the position of said vanes and the flow area of said casing and thereby control the speed of said turbine rotor, said speeder spring for different units being subject to variations in rate upon substantial compression, continually open orifice means located in said casing between said blades and said vanes for bleeding to atmosphere an increased portion of the air discharged from said blades as said vanes are moved toward the closed position and thereby changing the effective rate of said spring, and means for varying the open area of said orifice means to adjust the effective rate of said spring and compensate for variations between the actual and design rate of said spring.

8. A gas turbine unit as defined in claim 7 wherein said orifice means comprise first passage means in said casing, and said varying means comprises a rotatable ring surrounding said casing and having second passage means co-operating with said first passage means to vary the effective area of said first passage means upon rotation of said ring.

9. A method of adjusting the effective rate of the spring of a governor serving to control the fluid flow through a gas turbine by regulating the position of vanes located behind the turbine rotor, comprising passing a fluid through said turbine to determine the actual rate of the governor spring, adjusting the initial compression of said spring in accordance with the design requirements, and thereafter varying a bleed area between said rotor and said vanes to adjust the effective spring rate to the design spring rate.

10. A gas turbine unit comprising a casing defining a fluid passage, a turbine rotor having blades positioned within said casing to be driven by fluid flow throughout said casing, throttle means located within said casing for varying the flow area of said casing, governor means responsive to the speed of said rotor for moving said throttle means upon any change in speed sensed by said governor means in order to change the flow area of said casing and control the speed of said turbine rotor, and continually open orifice means located in said casing between said rotor and said throttle means for bleeding air from said casing, the size of the open area of said orifice means determining the effective rate of said governor means.

11. The method of adjusting the effective rate of the spring for a governor serving to control the speed of a turbine located within a flow passage by regulating the position of vanes within the passage to control the flow area of the passage and the fluid flow through the turbine, comprising passing a fluid through said passage and through said turbine to determine the actual rate of the governor spring as originally assembled over the speed range of the governor, adjusting the initial compression of said spring to meet the design requirements of initial compression, and thereafter varying a bleed area between said turbine and said vanes to adjust the effective spring rate to the design spring rate over the speed range of the governor.

References Cited in the file of this patent

UNITED STATES PATENTS

| | | |
|---|---|---|
| 705,124 | Olsson | July 22, 1902 |
| 1,114,713 | Dickinson | Oct. 20, 1914 |
| 1,154,594 | Rice | Sept. 21, 1915 |
| 2,111,878 | Tongeren | Mar. 22, 1938 |
| 2,247,151 | Clarke | June 24, 1941 |
| 2,376,199 | Shoults | May 15, 1945 |
| 2,388,975 | Jefferson | Nov. 13, 1945 |
| 2,689,680 | Lovesey | Sept. 21, 1954 |
| 2,770,943 | Beale | Nov. 20, 1956 |
| 2,797,858 | Von der Nuell | July 2, 1957 |

FOREIGN PATENTS

| | | |
|---|---|---|
| 247,831 | Switzerland | Jan. 3, 1948 |
| 311,920 | Switzerland | Feb. 15, 1956 |
| 672,193 | Great Britain | May 14, 1952 |
| 1,012,339 | France | Apr. 16, 1952 |